US012780548B2

(12) United States Patent
Eriksen et al.

(10) Patent No.: US 12,780,548 B2
(45) Date of Patent: Nov. 3, 2026

(54) SYSTEM FOR RETRIEVING AT LEAST ONE OBJECT FROM A STORAGE SYSTEM AND FILLING AT LEAST ONE CONTAINER

(71) Applicant: Pickr AS, Stavanger (NO)

(72) Inventors: Simon Marnburg Eriksen, Stavanger (NO); Fahad Azad, Stavanger (NO); Roald Valen, Stavanger (NO); Trond Kjerland, Klepp Stasjon (NO); Eymar Andri Birgisson, Reykjavik (IS)

(73) Assignee: Pickr AS, Stavanger (NO)

( * ) Notice: Subject to any disclaimer, the term of this patent is extended or adjusted under 35 U.S.C. 154(b) by 345 days.

(21) Appl. No.: 18/291,454

(22) PCT Filed: Aug. 4, 2022

(86) PCT No.: PCT/NO2022/050189

§ 371 (c)(1),
(2) Date: Jan. 23, 2024

(87) PCT Pub. No.: WO2023/018334

PCT Pub. Date: Feb. 16, 2023

(65) Prior Publication Data

US 2024/0208729 A1 Jun. 27, 2024

(30) Foreign Application Priority Data

Aug. 9, 2021 (NO) .................................... 20210970

(51) Int. Cl.
*B65G 1/04* (2006.01)
*B25J 9/00* (2006.01)
(Continued)

(52) U.S. Cl.
CPC .......... *B65G 1/1373* (2013.01); *B25J 9/0084* (2013.01); *B25J 9/0093* (2013.01); *G06Q 10/087* (2013.01)

(58) Field of Classification Search
CPC ...... B65G 1/1373; B65G 1/1375; B65G 1/04; B65G 1/137; B25J 9/0084; B25J 9/0093; G06Q 10/087
See application file for complete search history.

(56) References Cited

U.S. PATENT DOCUMENTS 9,600,798 B2 * 3/2017 Battles ........................ B25J 9/16
9,751,693 B1 * 9/2017 Battles ................... B25J 9/0084
(Continued)

FOREIGN PATENT DOCUMENTS

DE 102007025488 B3 9/2008
EP 1122194 A1 8/2001
(Continued)

OTHER PUBLICATIONS

Norwegian Application No. 20210970, Search Report dated Mar. 9, 2022, 3 pages.
(Continued)

*Primary Examiner* — Patrick H Mackey
(74) *Attorney, Agent, or Firm* — Andrus Intellectual Property Law, LLP

(57) ABSTRACT

A system is for retrieving at least one object from a storage system and filling at least one container, as defined in an order for retrieving objects from the storage system. The system has: a picking area for picking at least one object retrieved from the storage system; a first arrangement of shelves for temporarily storing at least one object moved from the picking area; at least one first robot for moving at least one object between the picking area and the first arrangement of shelves; a placing area for placing the at least one container to be filled in correspondence with a retrieval order; and at least one pick and place robot for picking an object from any of the picking area and the first arrangement of shelves and placing the picked object on a container
(Continued)

placed on the placing area in correspondence with a retrieval order.

19 Claims, 5 Drawing Sheets

(51) Int. Cl.

| | |
|---|---|
| ***B65G 1/137*** | (2006.01) |
| ***G06Q 10/087*** | (2023.01) |

(56) References Cited

U.S. PATENT DOCUMENTS

| | | | | |
|---|---|---|---|---|
| 9,950,863 | B2 * | 4/2018 | O'Brien | B65G 1/1373 |
| 10,192,195 | B1 | 1/2019 | Brazeau | |
| 10,384,872 | B2 * | 8/2019 | Wicks | B65G 1/1376 |
| 11,192,718 | B2 * | 12/2021 | Khodl | G07G 1/0036 |
| 11,276,026 | B2 * | 3/2022 | Dubois | B65G 1/1373 |
| 11,318,499 | B2 * | 5/2022 | Kalouche | B07C 3/008 |
| 2018/0282079 | A1 | 10/2018 | Heath | |
| 2018/0374144 | A1 * | 12/2018 | Smilowitz | B25J 9/0093 |
| 2020/0062505 | A1 | 2/2020 | Chirnomas | |
| 2022/0356017 | A1 * | 11/2022 | Romano | B07C 5/36 |

FOREIGN PATENT DOCUMENTS

| | | | |
|---|---|---|---|
| JP | 2001151312 | A | 6/2001 |
| JP | 2020001884 | A | 1/2020 |
| WO | 2017027751 | A1 | 2/2017 |
| WO | 2017176717 | A1 | 10/2017 |
| WO | 2018017612 | A1 | 1/2018 |
| WO | 2020067907 | A1 | 4/2020 |

OTHER PUBLICATIONS

PCT/NO2022/050189, International Preliminary Report on Patentability dated Nov. 6, 2023, 4 pages.

PCT/NO2022/050189, Written Opinion of The International Preliminary Examining Authority, dated Jul. 3, 2023, 4 pages.

PCT/NO2022/050189, Written Opinion of The International Searching Authority dated Nov. 8, 2022, 6 pages.

* cited by examiner

SYSTEM FOR RETRIEVING AT LEAST ONE OBJECT FROM A STORAGE SYSTEM AND FILLING AT LEAST ONE CONTAINER

CROSS-REFERENCE TO RELATED APPLICATIONS

This application is the U.S. national stage application of International Application No. PCT/NO2022/050189, filed Aug. 4, 2022, which international application was published on Feb. 16, 2023 as WO 2023/018334 A1 in the English language. The International Application claims priority to Norwegian Patent Application No. 20210970, filed Aug. 9, 2021. The international application and Norwegian application are both incorporated herein by reference, in their entirety.

FIELD

The present invention relates to a system for retrieving at least one object from a storage system and filling at least one container.

BACKGROUND

Known storage infrastructures, such as a warehouse, a distribution centre and a fulfillment centre, typically include at least one workstation for fulfilling retrieval orders. In this context, the purpose of a fulfillment workstation, also known as an order picking station, is to pick objects that have been retrieved from a storage system and place the picked objects into a container in accordance with a retrieval order.

Typically, a fulfillment workstation performs work on two flows of objects: on a first flow, there are objects that originated from a storage system; and on another flow, there are empty or partially filled containers, such as bins, for gathering the objects related to each retrieval order. These workstations may be operated by human beings, who pick objects originating from the storage system and place them in an order container. In some cases, these workstations may be operated by industrial robots mimicking the movements that a human operator would do.

When implementing an automated fulfillment workstation, there is typically a need for a high fulfillment rate, i.e. completing a high number of retrieval orders per time period. For example, in situations where each retrieval order is associated with a purchase order from a client, a high fulfillment rate is preferred because it contributes to reducing the time necessary for delivering the purchased objects to the client and this in turn contributes to making the delivery process commercially competitive.

It can be challenging to increase the fulfillment rate of a fulfillment workstation. A fulfillment rate of approximately 50 orders per hour is known to be considered as a high rate, and it can be challenging to achieve an even higher fulfillment rate.

There are known approaches in which an increase of the fulfillment rate of a fulfillment workstation can be achieved. However, these known approaches have highly undesirable scalability problems due to, at least, the conveyor systems that are used, which are complex, and/or the occupation of floor space. In particular, a manager of a facility such as a warehouse, distribution centre or fulfillment centre will be highly sensitive to present and future needs to occupy floor space, as this is an expensive resource. Thus, it is not desirable if a fulfillment workstation approach has a fulfillment rate that can only be increased in high dependence, for example in linear proportion, to the floor space that is occupied.

Some known approaches achieve picking and placing from multiple storage containers to multiple order containers, however the number of containers being processed at the same time in the storage and order sides is typically limited and/or disproportionate, such as: 4 storage containers to 4 order containers, 8 storage containers to 3 order containers, or 1 storage container to 44 order containers. Known relations between the number of containers in the storage and order sides typically create a choke point for achieving a high fulfillment rate.

SUMMARY

The invention will now be disclosed and has for its object to remedy or reduce at least one of the drawbacks of the known prior art, or at least provide a useful alternative to the known prior art. The object is achieved through features, which are specified in the description below and in the claims that follow. The invention is defined by the independent patent claims, and the dependent claims define advantageous embodiments of the invention.

According to a first aspect of the invention, there is provided a system for retrieving at least one object from a storage system and filling at least one container, each of the at least one container being filled as defined in an order for retrieving at least one object from the storage system. The system comprises:

- A picking area for placing at least one object retrieved from the storage system. The picking area can be part of a first conveyor system adapted to move objects from the storage system. The first conveyor system can be adapted to move objects both from and to the storage system.
- A first arrangement of shelves for temporarily storing at least one object from the picking area. The first arrangement of shelves can be positioned above the picking area, which has the advantage of contributing to the system occupying less floor space.
- At least one first robot for moving at least one object between the picking area and the first arrangement of shelves. This first robot can store objects on the first arrangement of shelves that are expected to be frequently ordered for retrieval.
- A placing area for placing the at least one container to be filled in correspondence with a retrieval order. Similarly to the picking area, the placing area can be part of a second conveyor system. However, the second conveyor system is adapted to move empty containers into the system. Also, the second conveyor system can be adapted to move containers filled as defined in a corresponding retrieval order out of the system, for example to a packaging area.
- At least one pick and place robot for picking an object from any of the picking area and the first arrangement of shelves and placing the picked object on a container on the placing area in correspondence with a retrieval order.

It can be observed that the first arrangement of shelves and the at least one first robot enable a temporary storage that can be used for achieving a retrieval time that is shorter than the retrieval time of the storage system. This enables the system to be faster at completing retrieval orders in the placing area. Thus, it becomes possible to achieve processing speed gains similar to those caused by a cache memory in a computer. For example, the first arrangement of shelves can be used for storage of frequently or recently retrieved kinds of objects.

In one embodiment, the at least one object retrieved from the storage system is provided on the picking area by retrieving at least one storage container from the storage system. An example of such a storage container is a Euro container, also known as a KLT box. Also, the first arrangement of shelves in this embodiment is adapted to temporarily store the at least one storage container. For example, the first arrangement of shelves may be designed so that each shelf is adequately dimensioned to received and support at least one storage container. Moreover, the at least one first robot of this embodiment is adapted to move the at least one storage container between the picking area and the first arrangement of shelves. The at least one first robot may be adapted to manoeuvre a tool that is suitable for picking, moving and placing storage containers.

It can be seen that the ability to manipulate storage containers originating from the storage system can increase the efficiency of moving objects from the storage system, via the picking area, to the temporary storage in the first arrangement of shelves. For example, a storage container holding ten instances of an object having a high frequency of retrieval can be moved from the picking area to the first arrangement of shelves in one operation. Also, providing storage containers on the first arrangement of shelves increases the amount and diversity of objects made available to the at least one pick and place robot, which may further contribute to the increase of the fulfillment rate by minimizing the occurrence of situations in which the pick and place robot has to wait for retrieval operations from the storage system.

In one embodiment, the system comprises a second storage system for storing objects from the picking area and the at least one first robot is adapted to move objects or containers between the picking area, the first arrangement of shelves and the second storage system. Alternatively, another system embodiment comprises the storage system, the storage system being for storing objects and/or containers from the picking area. Also, in this embodiment, the at least one first robot is adapted to move objects and/or containers between the picking area, the first arrangement of shelves and the storage system.

In one embodiment, the system comprises a second arrangement of shelves for temporarily storing at least one container corresponding to a retrieval order and at least one second robot for moving the at least one container between the placing area of and the second arrangement shelves. The second arrangement of shelves can be positioned above the placing area, which also has the advantage of contributing to the system occupying less floor space.

It can be observed that including the second arrangement of shelves allows more retrieval orders to be processed in parallel. This increases the number of retrieval orders that can be processed during the same period and also contributes to increasing the fulfillment rate of the system.

In one embodiment, the system includes a control unit for controlling the at least one pick and place robot, the at least one first robot and the at least one second robot, the control unit comprising a processing unit and a memory.

The control unit may also be adapted to control the first conveyor system for the picking area and the second conveyor system for the placing area. In one embodiment, the control unit is configured to carry out the steps of:

controlling the second conveyor system to move a pre-configured number of empty containers to the placing area;

waiting a pre-configured amount of time;

repeating the preceding steps.

The controlling step may include also controlling the second conveyor system to move a pre-configured number of filled containers out of the system. The pre-configured number of filled containers may be equal to the pre-configured number of empty containers.

The control unit may be configured to re-arrange the order of any of the objects to be picked in view of the retrieval orders pending to be fulfilled so that the fulfillment rate of retrieval orders is increased. The control unit may be further configured so that the order re-arrangement is carried out based on at least one previous measurement of the time it took for the at least one pick and place robot to pick an object from a position in any of the picking area and the first arrangement of shelves and place the picked object at a position in any of the placing area and the second arrangement of shelves.

BRIEF DESCRIPTION OF THE DRAWINGS

Embodiments of the invention will now be described, by way of example only, with reference to the accompanying drawings, in which.

Figure 1:
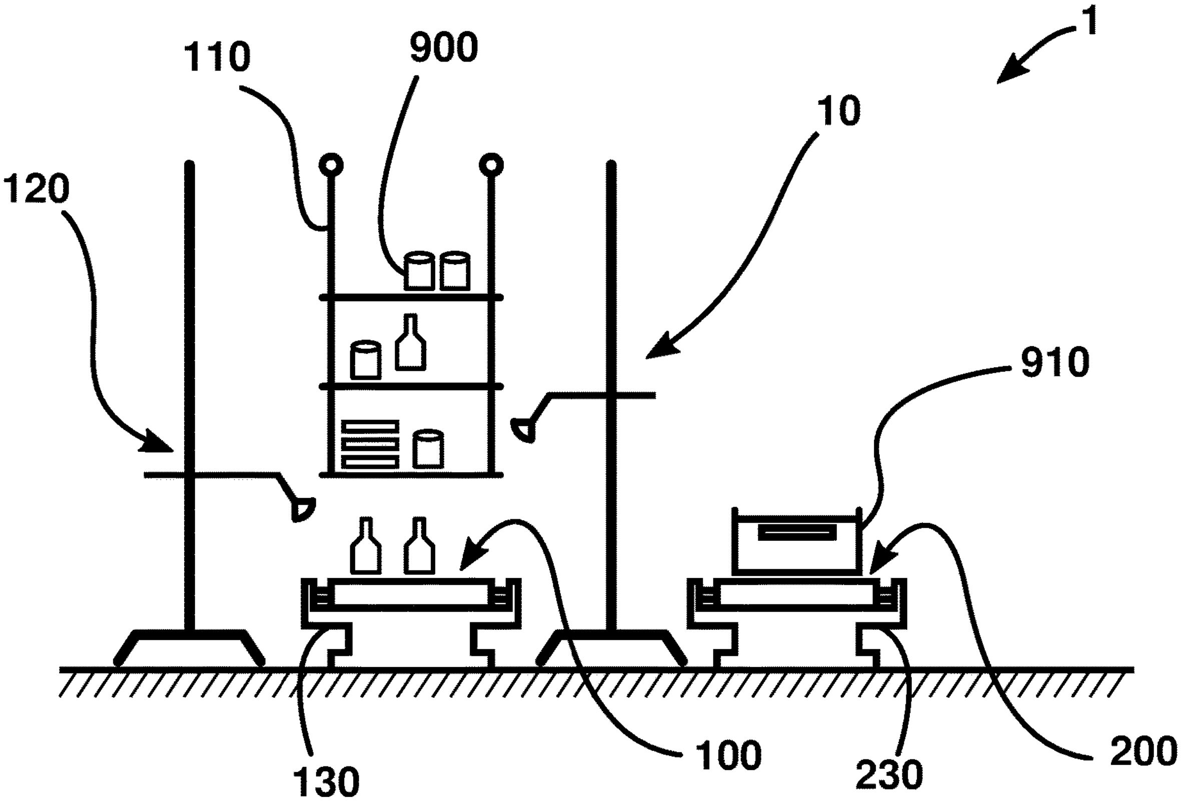
FIG. 1 is a schematic elevation view of a first system embodiment.

The drawings are shown in a schematic and simplified manner, and features that are not necessary for explaining the invention may be left out. Identical reference numerals refer to identical or similar features in the drawings. The various features shown in the drawings may not necessarily be drawn to scale.

DETAILED DESCRIPTION OF THE EMBODIMENTS

Turning now to FIG. 1, it shows a first system embodiment 1 from a schematic elevation view with a floor illustrated at the bottom of the figure. The elevation view shows the components of the system 1 illustrated laterally and along their width and the skilled person will be able to understand how these extend longitudinally along their length (not shown in the figure). Also, for the purposes of simplifying the figure, only a few objects 900 have been marked with the appropriate reference numerals.

The system 1 shown in FIG. 1 is installed in a building, such as a warehouse, distribution centre or fulfillment centre, in which there is also a storage system installed for storing and retrieving objects 900. Also, the system 1 can be understood as having two sides: a storage side, which generally corresponds to the left-hand half of FIG. 1 and generally relates to the manoeuvring of objects which are still in storage, or at least in temporary storage, but which have not yet been placed into a container 910 related to a retrieval order; and an order side, which generally corresponds to the right-hand half of FIG. 1 and generally relates to manoeuvring objects 900 which have been placed into a container 910 related to a retrieval order.

On the storage side, the system 1 includes a picking area 100 for picking at least one object 900 retrieved from the storage system, a first arrangement of shelves 110 for temporarily storing objects 900 above the picking area 100, and a first robot 120 for moving objects 900 between the picking area 100 and the first arrangement of shelves 110.

The picking area 100 is a portion of a first conveyor system 130, for example a conveyor belt system, and two objects 900 may be seen on the picking area 100. The first conveyor system 130 enables the transportation of objects 900 retrieved from the storage system into the system 1. The first conveyor system 130 can also be used to move objects 900 out of the system 1, for example back to the storage system. Although two objects 900 are observable on the picking area 100 in FIG. 1, the skilled person will see that more (not shown) objects 900, which were also retrieved from the storage system, may be provided along the length of the picking area 100. From the view illustrated in FIG. 1, those further objects 900 could be standing behind the two objects 900 that are shown on the picking area 100.

The first arrangement of shelves 110 can be seen positioned above the picking area 100. In particular, it can be seen that the first arrangement of shelves 110 is hanging from above, for example from a ceiling. The skilled person will see that many other options are known for positioning the first arrangement of shelves 110 above the picking area 100, such as positioning the first arrangement of shelves 110 with supports from the floor (for example using standard racks or flow racks) so that the first arrangement of shelves 110 is positioned over the picking area 100. This position for the first arrangement of shelves 110 is advantageous in that it contributes to minimizing the amount of floor space occupied by the system 1. In the shown embodiment, the first arrangement of shelves 110 includes three shelves, each shelf having sufficient space for storing at least one object 900. The skilled person will see that a different number or size of shelves can be provided, and the first arrangement of shelves 110 can be dimensioned in height, length (not shown in FIG. 1) and width within the scope of the invention. The skilled person will also see that the first arrangement of shelves 110 can be positioned in other locations such as below the picking area 100.

The first robot 120 is schematically illustrated on the left-hand side of FIG. 1. The first robot 120 includes a known tool for picking objects 900 from the picking area 100 and placing the picked objects 900 on a shelf of the first arrangement of shelves 110 above. Such a known tool can be a controllable suction device or a robotic hand/claw. The first robot 120 can also perform the opposite operation and move objects 900 from the first arrangement of shelves 110 to the picking area 100. The first robot 120 may include a known means for moving the tool along the height and the length of the system 1. Such a known moving means may be a cartesian coordinate robot or a polar coordinate robot installed along an XZ plane (i.e. a plane along the height and the length of the system 1). The first robot 120 can also include a linear actuator, such as a cascading actuator, for moving the tool into and from the picking area 100 and the first arrangement of shelves 110. The skilled person will understand without inventive skills that more instances of the first robot 120 (not shown) may be provided along the length of the system 1. From the view illustrated in FIG. 1, those further instances of the first robot 120 would be standing behind the first robot 120 that is shown on the left-hand side of FIG. 1. Thus, the picking area 100 can include more positions along its length from which the first robot 120 is able to pick or place objects 900.

As explained above, the first conveyor system 130 can transport objects 900 retrieved from the storage system into the system 1, and it can also be used for moving objects 900 out of the system 1, for example back to the storage system. The first conveyor system 130 can be controlled in various known ways. One way of controlling the first conveyor system 130 is to have it move with a constant speed. Although this is a simple mode of operation for the first conveyor system 130, the first robot 120 and the pick and place robot 10 (described below) need to be configured appropriately for picking and placing objects on the first conveyor system 130 while the latter moves. Another way of controlling the first conveyor system 130 is to alternate between having the first conveyor system 130 move during a period and stop during another period. This mode of operation requires programming the first conveyor system 130 to perform the alternating operation, but the first robot 120 and the pick and place robot 10 can be configured with simpler picking and placing routines by doing them when the first conveyor system 130 is stopped. The skilled person will see there are possible alternatives to these modes of operation without requiring inventive skills.

In general, on the storage side of the system 1 there is a flow of objects 900 coming from the storage system via the first conveyor system 130 and into the picking area 100 of the system 1. The first robot 120 can move objects 900 from the flow of objects 900 passing the picking area 100, which is part of the first conveyor system 130, to the first arrangement of shelves 110, and vice versa. It is also possible to move objects 900 out of the system 1 by letting the objects 900 continuing to be on the first conveyor system 130.

On the order side of the system 1 (see generally the right-hand half of FIG. 1), there is provided a placing area 200 for placing at least one container 910 to be filled with objects 900. Each container 910 in the placing area 200 is to be filled as defined in a retrieval order. In FIG. 1, one container 910 can be seen on the placing area 200, but the skilled person will see that more containers 910 may be provided along the (not shown) length of the placing area 200. In the elevation view shown in FIG. 1, those further containers 910 would be behind the container 910 that is shown in FIG. 1. Thus, several retrieval orders may be processed in parallel on the placing area 200.

Similarly to the picking area 100, the placing area 200 is part of a second conveyor system 230, which is illustrated in FIG. 1 as a conveyor belt system shown along its width. However, the second conveyor system 200 is used for moving empty containers 910 into the system 1 and moving filled containers 910 out of the system 1, for example towards a packaging area. When a container 910 is filled, all the objects 900 defined in the retrieval order have been placed into the container 910. When a container 910 is not filled, it can either be empty or partially filled, i.e. gathering some but not all of the objects 900 defined in the retrieval order. It should be emphasized that by “filled” is meant that the retrieval order has been finalized/fulfilled and not necessarily that the container is full.

Between the storage side (left-hand half in FIG. 1) and the order side (right-hand half in FIG. 1) of the system 1, there is provided a pick and place robot 10 for picking objects 900 from any of the picking area 100 and the first arrangement of shelves 110 and placing the picked objects 900 on a container 910 placed on the placing area 200. The pick and place robot 10 includes a tool for picking objects 900, such as a controllable suction device or fingers. It also includes means for moving the tool along any of the length and the height of the system 1, such as a cartesian coordinate robot installed vertically. It further includes actuators for rotating the tool between the order side and the storage side of the system 1. The skilled person will know many alternatives and possible implementations for the pick in place robot 10 here described.

The placing of objects 900 on the containers 910 stored on the placing area 200 is carried out in accordance with the retrieval orders that the system 1 is fulfilling. In particular, each container 910 in the placing area 200 corresponds to a retrieval order and the objects 900 to be gathered inside each container 910 are to be the objects 900 listed in the corresponding retrieval order. Therefore, the placing area 200 provides a flow in which there are empty or partially filled containers 910 for gathering, within the containers 910, the objects 900 related to each retrieval order.

It can be observed that, similarly to the speed gains of a cache memory in a computer, the first arrangement of shelves 110 and the first robot 120 create a temporary storage that can be used for increasing the fulfillment rate of the system 1 at completing retrieval orders in the placing area 200. The speed gain results from the pick and place robot 10 taking less time to pick objects 900 from the storage side and placing them on the containers 910 on the placing area 200 than the time it takes to retrieve an object 900 from the storage system to which the first conveyor system 130 is connected. The temporary storage of the picking area 100 and the first arrangement of shelves 110 can be used by the system 1 to maximize the number of objects 900 waiting to be picked by the pick and place robot 10 and minimizing the need to wait for the retrieval of objects 900 from the storage system when these are not yet in the temporary storage of the system 1.

Figure 2:
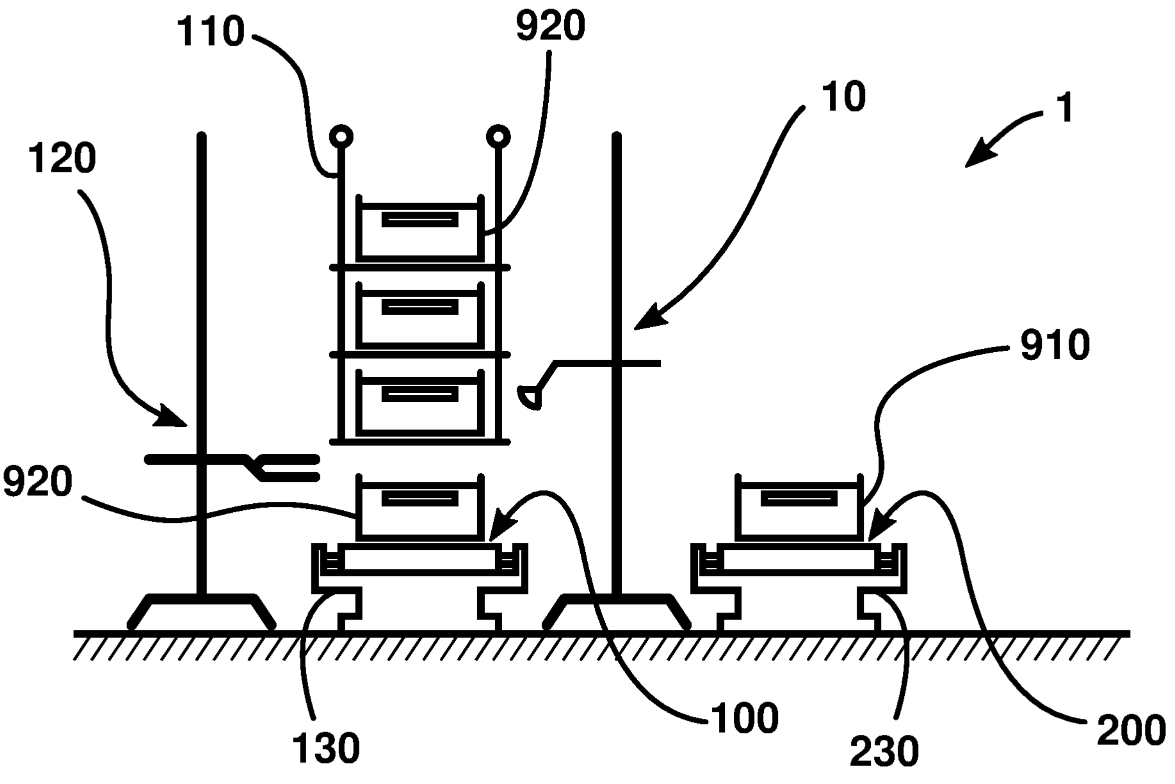
FIG. 2 is a schematic elevation view of a second system embodiment in which storage containers are used for storing objects.

FIG. 2 shows a second system embodiment 1 that is similar to the first system embodiment in FIG. 1, however the objects 900 retrieved from the storage system are moved within storage containers 920 and the components of the system 1 on the storage side (generally corresponding to the left-hand half of FIG. 2) are adapted to handle those storage containers 920.

On the picking area 10, the objects 900 retrieved from the storage system are provided within storage containers 920. The objects 900 are not visible in FIG. 2 because they are inside the storage containers 920. The storage containers 920, retrieved from the storage system, are moved into the system 1 by the first conveyor system 130.

The first arrangement of shelves 110 is adapted to store storage containers 920. This can be achieved by having each shelf in the arrangement of shelves 110 suitably dimensioned in width, length, and height for supporting at least one storage container 920. Each shelf can be further configured in height so that it includes empty space above a storage container 920 when the latter is stored on the shelf. Thus, the objects 900 within the storage container 920 may be picked directly from the storage container 920 on the shelf. Moreover, the first arrangement of shelves 110 can be positioned above the picking area 100 with sufficient distance from the picking area 100 so that there is an empty space between the first arrangement of shelves 110 and a storage container 920 supported on the picking area 100, the empty space being suitably high to allow objects 900 on the storage container 920 to be picked and placed directly from the storage container 920 on the picking area 100.

The first robot 120 is adapted with a tool to move storage containers 920 between the picking area 100 and the first arrangement of shelves 110. The skilled person will know various alternatives for the tool that can be used by the first robot 120. Thus, the storage containers 920 on the picking area 100 can be moved to the first arrangement of shelves 110, and vice versa.

It can be seen that the ability to manipulate storage containers 920 originating from the storage system increases the efficiency of moving objects 900 from the storage system, via the picking area 100, to the temporary storage in the first arrangement of shelves 110. In one operation by the first robot 120, it is possible to move a storage container 920 holding a plurality of objects 900 from the picking area 100 to the first arrangement of shelves 110, and thus increasing the amount and diversity of objects 900 made available to the pick and place robot 10. In general, using storage containers 920 on the storage side of the system 1 contributes to increasing the fulfillment rate by maximizing the number of objects 900 waiting, within the system 1, to be picked by the pick and place robot 120 and minimizing the occurrence of situations in which the pick and place robot 10 has to wait for retrieval operations from the storage system.

Figure 3:
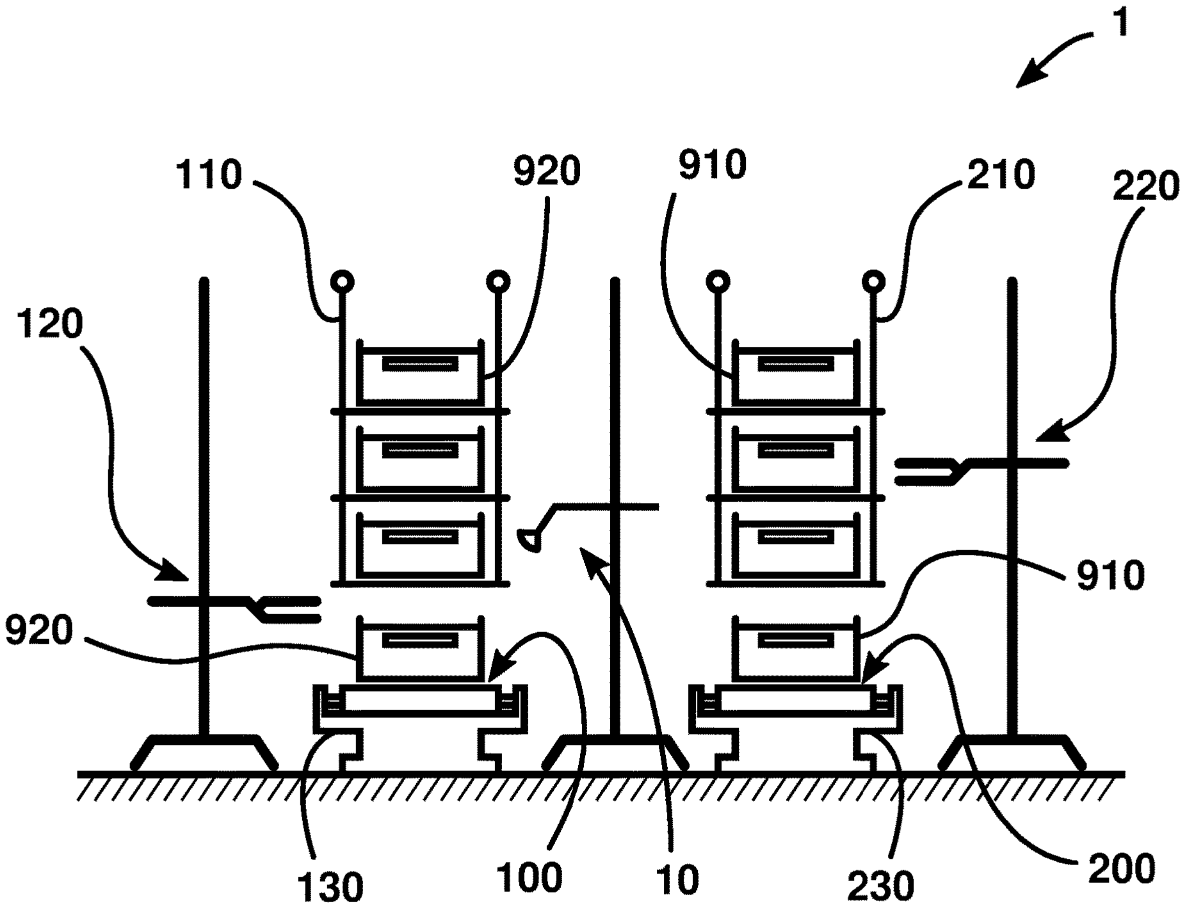
FIG. 3 is a schematic elevation view of a third system embodiment including a second arrangement of shelves for temporarily storing containers with partially completed retrieval orders.

FIG. 3 shows a third system embodiment 1 that is similar to the system 1 shown in FIG. 2. However, the system 1 in FIG. 3 includes further components on the order side of the system 1 (generally corresponding to the right-hand half of FIG. 3) for increasing the number of containers 910 that are being filled by the pick and place robot 10.

The system 1 includes a second arrangement of shelves 210 for temporarily storing containers 920. The second arrangement of shelves 210 is adapted so that each shelf may store at least one container 910. This adaptation may be achieved by configuring each shelf with dimensions suitable for receiving and supporting the container 910. The second arrangement of shelves 210 may be further adapted so that each shelf has a height that provides an empty space above a container 910 when the latter is supported on the shelf, this empty space being suitable for the pick and place robot 10 to place objects directly within a container 910 supported on a shelf.

Similarly to the position of the first arrangement of shelves 110 relative to the picking area 100, the second arrangement of shelves 210 is positioned above the placing area 200. Also here, the second arrangement of shelves 210 may be positioned above the placing area 200 so that an empty space is provided above a container 910 on the placing area 200, the empty space being suitable for the pick and place robot 10 to place objects 900 directly within the container 910 on the placing area 200. The skilled person will also see that the second arrangement of shelves 210 can be positioned in other locations such as below the placing area 200.

The system also includes a second robot 220 for moving containers 910 from the placing area 200 to the second arrangement of shelves 210, and vice versa. The second robot 220 is similar to the first robot 120 on the storage side of the system 1, and the former includes a tool that is suitable for picking, moving and placing containers 910. In one embodiment, the containers 910 used on the order side of the system 1 are similar to the storage containers 920 used on the storage side of the system 1, having similar dimensions and differing in their colours to facilitate a visual distinction between the two types of containers to the personnel working nearby the system. For example, the storage containers 920 on the storage side of the system 1 may be grey and the containers 910 on the order side of the system 1 may be red (the colours are not visible in the Figures).

It can be seen that the system 1 in FIG. 3 has a higher number of retrieval orders being processed at the same time. This increase is caused by the number of positions for holding containers 910 that is added by the second arrangement of shelves 210. A higher number of retrieval orders being processed in parallel can also contribute to increasing the fulfillment rate of the system 1, as it maximizes the number of containers 910 waiting to be filled and minimizes the occurrence of situations in which the pick and place robot 10 has to wait for empty containers 910 to be brought into the system to be filled.

Figure 4:
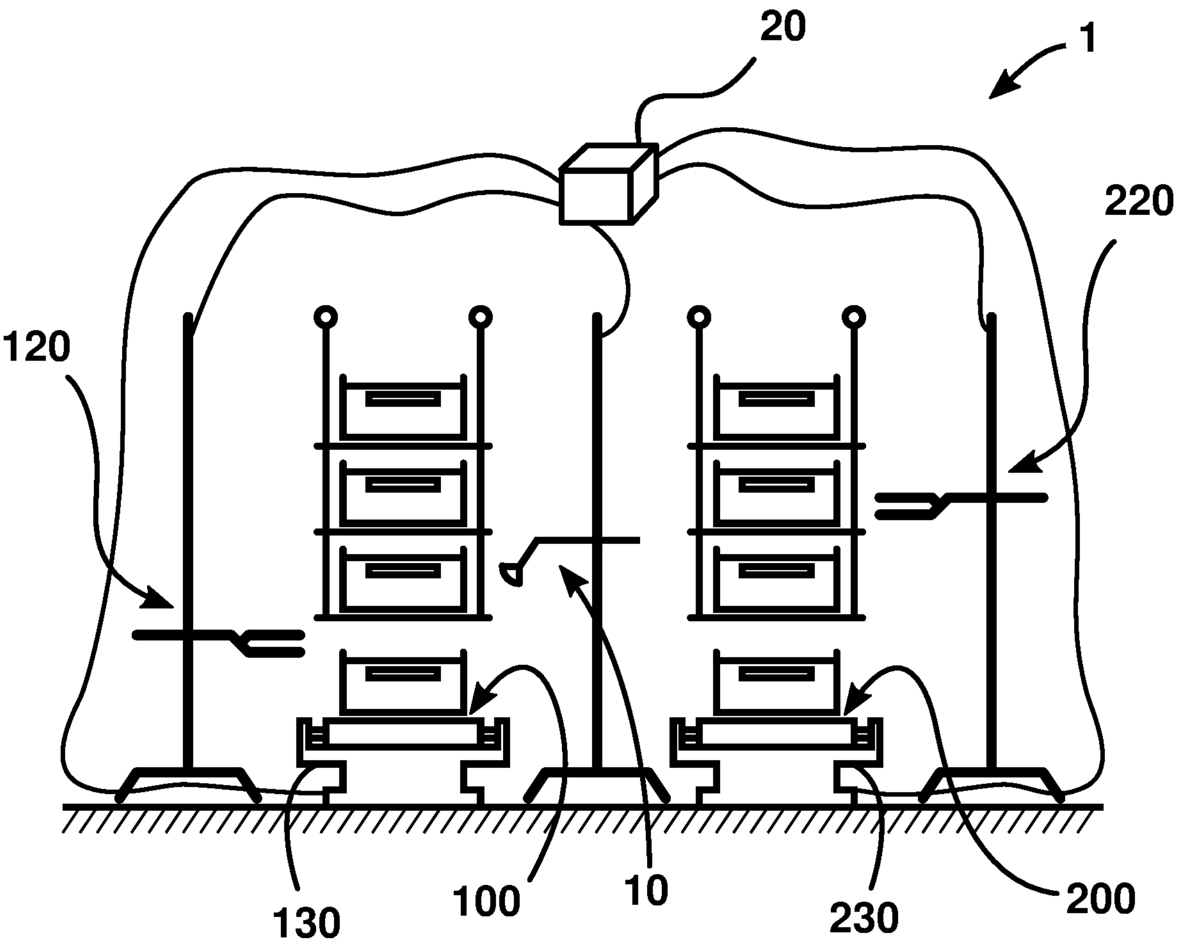
FIG. 4 is a schematic elevation view of a fourth system embodiment including a control unit for controlling for a pick and place robot, a first robot and a second robot.

FIG. 4 shows an illustration of a fourth system embodiment 1 that is similar to the system 1 shown in FIG. 3 but the illustration in FIG. 4 includes a control unit 20 for controlling the actuating components of the system 1 and communicating with the first and second conveyor systems 130,230. Although wired connections are illustrated in the figure, some or all of the connections may be wireless. For the purposes of facilitating the understanding of FIG. 4, some reference numerals of the system 1 have been hidden.

In this system embodiment 1, the control unit 20 is connected to the actuating components of the system 1: the pick and place robot 10; the first robot 120; and the second robot 220. The control unit 20 is also connected to both the first and second conveyor systems 130, 230 to obtain status data, so that the actuating components 10,120,220 may be controlled to move objects 900, containers 910 or storage containers 920 successfully while taking into account the status of the first and second conveyor systems 130, 230. For example, the control unit 20 may obtain data from any of the first and second conveyor systems 130,230 to calculate the position of a storage container 920 or a container 910 on the picking area 100 and placing area 200, respectively.

In other embodiments of the system 1, the first and second conveyor systems 130, 230 may be included in the system 1 and the control unit 20 may be also configured to fully control the operation of these conveyor systems 130, 230.

Additionally, the system 1 may include sensors in combination with the first and second conveyor systems 130, 230 to identify objects 900, containers 910 or storage containers 920 when these enter and exit the picking area 100 and the placing area 200. For example, each of the containers 910 and storage containers 920 may be provided with a unique identifying number, which can be provided as a graphical representation, such as a barcode or a QR code, to be read by image sensors or a contactless tag, e.g. an RFID tag, that can be read by an appropriate sensor. The skilled person will know other alternatives for implementing both the sensors and the unique identification.

The second conveyor system 230 can be operated in different modes. In one embodiment, the second conveyor system 230 may function in a fashion analogous to a train station, in which the following steps are repeated cyclically:

- the second conveyor system 230 moves a pre-configured number of empty containers 910 (e.g. 4, 8 or 16 containers) to the placing area 200; and
- the second conveyor system 230 remains stopped during a pre-configured amount of time (e.g. 30 seconds, 1 minute or 2 minutes).

When the two conveyor systems 130,230 are included in the system 1, it is the control unit 20 that controls the second conveyor system 230 to carry out these steps. Also, the step of the second conveyor system 230 moving a pre-configured number of empty order containers 910 to the placing area 200 may further include controlling the second conveyor system 230 to move a pre-configured number of filled containers 910 out of the placing area 200. Moreover, the pre-configured number of filled containers 910 may be equal to the pre-configured number of empty containers 910.

It can be observed that a system with this type of cyclical operation allows relying on the predictability of the incoming and outgoing order containers 230, which can be useful in reducing the complexity of the methods configured in the control unit 20 to control the actuating components of the system 1 to fulfill retrieval orders.

Other modes of operation of the second conveyor system 230 may be executed and the skilled person will see different combinations of advantages and disadvantages between known modes of operation.

In one example, the second conveyor system 230 may operate to move the pre-configured number of empty containers 910 to the placing area 200 and then stop until all the moved containers 910 have been filled. Only then will that pre-configured number of filled containers be moved out of the placing area 200 at the same time a new set of empty containers 910 is moved in. This mode of operation can also be seen analogously to a train-station, but the "train" only leaves once all the passengers have boarded. The skilled person will notice without inventive skills that the operation of the second conveyor system 230 requires an input related the status of fulfillment of the containers 910 on the placing area 200 and the time between the movements of the second conveyor system 230 may vary.

In another example, the second conveyor system 230 is operated to move one empty container 910 into the placing area 200 at the same time one filled container 910 is moved out of the placing area 200. In this example, the operation of the second conveyor system 230 will also require an input indicating when the placing area 200 is ready to produce a filled container 910 to be moved out of the placing area 200.

In a further example, the second conveyor system 230 is operated at a constant speed, which is preferably a speed sufficiently low to allow, on average, the picking and place robot 10 to fulfill a retrieval order between the moments in which a container 910 enters and leaves the placing area 200. This example may involve simpler configurations to control the operation of the second conveyor system 230 but both the pick and place robot 10 and the second robot 220 will need to be operated in a successful manner for actuating on the containers 910 while the latter travel on the placing area 200.

In order to increase the fulfillment rate of retrieval orders, the control unit 20 may be configured to re-arrange the order of any of the objects to be picked in view of the retrieval orders pending to be fulfilled. The skilled person will know some ways of implementing the re-arrangement of the order of the objects to be picked, such as ways taking into account the current distances between each of the containers 910 on the order side of the system 1 (e.g. on the placing area 200 or the second arrangement of shelves 210) and the respective objects to be picked from the storage side (e.g. on the picking area 100 or the first arrangement of shelves 110).

The control unit 20 may be further configured so that the order re-arrangement is carried out based on at least one previous measurement of the time it took for the at least one pick and place robot 10 to pick an object from a position in any of the picking area 100 and the first arrangement of shelves 110 and place the picked object in a container 910 stored in any of the placing area 200 and, if included in the system 1, the second arrangement of shelves 210.

Figure 5:
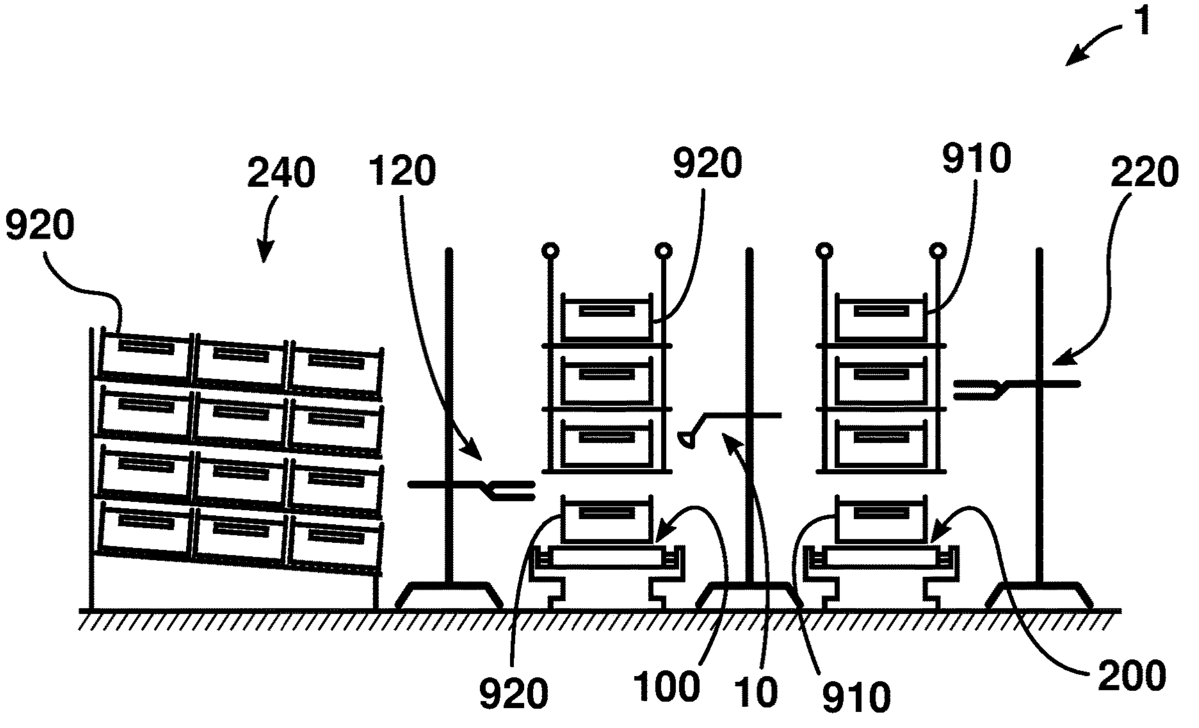
FIG. 5 is a schematic elevation view of a fifth system embodiment including a storage system.

FIG. 5 shows a fifth system embodiment 1 similar to the system embodiments 1 shown in FIGS. 3 and 4. However, the storage side of the system 1 (generally corresponding to the left-hand half of FIG. 5) is adapted to include a second storage system 240 for storing objects 900 in addition or alternative to the storage system. This embodiment provides a useful manner of expanding the storage capacity.

The second storage system embodiment 240 illustrated in FIG. 5 includes inclined shelves, which is one of several possible embodiments. The use of inclined shelves in the second storage system 240 can be advantageously used for having the storage containers 920 biased to slide towards the lower portion of an inclined shelf. The first robot 120 can thus be sufficient to manoeuvre storage containers 920 into and from the second storage system embodiment 240.

The skilled person will see, without requiring inventive skills, that the system 1 shown in FIG. 5 can also be implemented so that the second storage system 240 (shown in FIG. 5) is the only storage system that is used by the system 1 for retrieving objects to fulfill retrieval orders. Thus, the following combinations of system 1 and storage system can be observed by the skilled person: the picking area 100 of the system 1 is used for picking at least one object and/or at least one container from a storage system external to the system 1; the picking area 100 of the system 1 is used for picking at least one object and/or at least one container from a storage system external to the system 1 or from a second storage system 240 that is part of the system 1; and the picking area 100 of the system 1 is used for picking at least one object and/or at least one container from only the second storage system 240 that is part of the system 1. In this latter example, the picking area 100 may also receive objects from an external area that is not a storage system, such as an area for receiving new objects and/or containers into a warehouse or building.

Generally, the terms used in this description and claims are interpreted according to their ordinary meaning the technical field, unless explicitly defined otherwise. Notwithstanding, the terms "comprises" and "comprising" and variations thereof mean that the specified features, steps or integers are included. These terms are not interpreted to exclude the presence of other features, steps or integers. Furthermore, the indefinite article "a" or "an" is interpreted openly as introducing at least one instance of an entity, unless explicitly stated otherwise. An entity introduced by an indefinite article is not excluded from being interpreted as a plurality of the entity.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the embodiments described above, many equivalent modifications and variations will be apparent to those skilled in the art when given this disclosure. Accordingly, the embodiments of the invention set forth above are considered to be illustrative and not limiting. Various changes to the described embodiments may be made without departing from the spirit and scope of the invention.

The invention claimed is:

1. A system for retrieving at least one object from a storage system and filling at least one container, each of the at least one container being filled as defined in an order for retrieving at least one object from the storage system, wherein the system comprises:

a picking area for picking at least one object retrieved from the storage system;

a first arrangement of shelves for temporarily storing at least one object moved from the picking area;

at least one first robot for moving at least one object between the picking area and the first arrangement of shelves;

a placing area for placing the at least one container to be filled in correspondence with a retrieval order; and at least one pick and place robot for picking an object from both the picking area and the first arrangement of shelves and placing the picked object on a container placed on the placing area in correspondence with a retrieval order;

wherein the first arrangement of shelves is positioned above the picking area.

2. The system according to claim 1, wherein the picking area is part of a first conveyor system for moving objects from the storage system.

3. The system according to claim 2, wherein the first conveyor system is adapted to move objects both from and to the storage system.

4. The system according to claim 2, the system comprising a control unit for controlling the at least one pick and place robot and the at least one first robot, wherein the control unit comprises a processing unit and a memory, and wherein the control unit is adapted to control the first conveyor system for the picking area and a second conveyor system for the placing area.

5. The system according claim 1, wherein the placing area is part of a second conveyor system for moving empty containers into the system.

6. The system according to claim 5, wherein the second conveyor system is further adapted to move filled containers out of the system.

7. The system according to claim 1, wherein the at least one object retrieved from the storage system is provided on the picking area by retrieving at least one storage container from the storage system, wherein the first arrangement of shelves is adapted to temporarily store the at least one storage container, and wherein the at least one first robot is adapted to move the at least one storage container between the picking area and the first arrangement of shelves.

8. The system according to claim 1, the system comprising a second storage system for storing objects from the picking area, and wherein the at least one first robot is adapted to move objects and/or containers between the picking area, the first arrangement of shelves and the second storage system.

9. The system according to claim 1, the system comprising:

a second arrangement of shelves for temporarily storing at least one container corresponding to a retrieval order; and at least one second robot for moving the at least one container between the placing area and the second arrangement of shelves.

10. The system according to claim 9, wherein the second arrangement of shelves is positioned above the placing area.

11. The system according to claim 1, the system comprising a control unit for controlling the at least one pick and place robot and the at least one first robot, wherein the control unit comprises a processing unit and a memory.

12. The system according to claim 11, wherein the control unit is configured to re-arrange the order of any of the objects to be picked in view of the retrieval orders pending to be fulfilled so that the fulfilment rate of retrieval orders is increased.

13. The system according to claim 12 wherein the control unit is further configured so that the order re-arrangement is carried out based on at least one previous measurement of the time it took for the at least one pick and place robot to pick an object from a position in any of the picking area and the first arrangement of shelves and place the picked object in a container stored in any of the placing area.

14. An arrangement comprising:

a storage system; and a system according to claim 1, the system being usable to retrieve at least one object from the storage system and fill at least one container, and wherein the at least one first robot of the system is adapted to move objects and/or container between the picking area, the first arrangement of shelves and the storage system.

15. A system for retrieving at least one object from a storage system and filling at least one container, each of the at least one container being filled as defined in an order for retrieving at least one object from the storage system, wherein the system comprises:

a picking area for picking at least one object retrieved from the storage system;

a first arrangement of shelves for temporarily storing at least one object moved from the picking area;

at least one first robot for moving at least one object between the picking area and the first arrangement of shelves;

a placing area for placing the at least one container to be filled in correspondence with a retrieval order; and at least one pick and place robot for picking an object from both the picking area and the first arrangement of shelves and placing the picked object on a container placed on the placing area in correspondence with a retrieval order;

a control unit for controlling the at least one pick and place robot and the at least one first robot, wherein the control unit comprises a processing unit and a memory;

wherein the picking area is part of a first conveyor system for moving objects from the storage system;

wherein the control unit is adapted to control the first conveyor system for the picking area and a second conveyor system for the placing area; and wherein the control unit is configured to carry out the steps of:

controlling the second conveyor system to move a pre-configured number of empty containers to the placing area;

waiting a pre-configured amount of time; and repeating the preceding steps.

16. The system according to claim 15, wherein the controlling step further comprises controlling the second conveyor system to move a pre-configured number of filled containers out of the placing area.

17. The system according to claim 16, wherein the pre-configured number of filled containers is equal to the pre-configured number of empty containers.

18. A system for retrieving at least one object from a storage system and filling at least one container, each of the at least one container being filled as defined in an order for retrieving at least one object from the storage system, wherein the system comprises:

a picking area for picking at least one object retrieved from the storage system;

a first arrangement of shelves for temporarily storing at least one object moved from the picking area;

at least one first robot for moving at least one object between the picking area and the first arrangement of shelves;

a placing area for placing the at least one container to be filled in correspondence with a retrieval order;

at least one pick and place robot for picking an object from both the picking area and the first arrangement of shelves and placing the picked object on a container placed on the placing area in correspondence with a retrieval order;

a second arrangement of shelves for temporarily storing at least one container corresponding to a retrieval order; and at least one second robot for moving the at least one container between the placing area and the second arrangement of shelves.

19. A system for retrieving at least one object from a storage system and filling at least one container, each of the at least one container being filled as defined in an order for retrieving at least one object from the storage system, wherein the system comprises:

a picking area for picking at least one object retrieved from the storage system;

a first arrangement of shelves for temporarily storing at least one object moved from the picking area;

at least one first robot for moving at least one object between the picking area and the first arrangement of shelves;

a placing area for placing the at least one container to be filled in correspondence with a retrieval order;

at least one pick and place robot for picking an object from both the picking area and the first arrangement of shelves and placing the picked object on a container placed on the placing area in correspondence with a retrieval order;

a control unit for controlling the at least one pick and place robot and the at least one first robot, wherein the control unit comprises a processing unit and a memory;

wherein the control unit is configured to re-arrange the order of any of the objects to be picked in view of the retrieval orders pending to be fulfilled so that the fulfilment rate of retrieval orders is increased.

* * * * *